(12) United States Patent
Gong et al.

(10) Patent No.: US 11,327,354 B2
(45) Date of Patent: May 10, 2022

(54) ARRAY SUBSTRATE, METHOD OF DRIVING ARRAY SUBSTRATE, METHOD OF FABRICATING ARRAY SUBSTRATE, AND DISPLAY PANEL

(71) Applicants: HEFEI BOE OPTOELECTRONICS TECHNOLOGY CO., LTD., Anhui (CN); BOE Technology Group Co., Ltd., Beijing (CN)

(72) Inventors: Kui Gong, Beijing (CN); Xianxue Duan, Beijing (CN); Tianzhen Liu, Beijing (CN); Cheng Chen, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 684 days.

(21) Appl. No.: 16/332,492

(22) PCT Filed: Jun. 27, 2018

(86) PCT No.: PCT/CN2018/093132
§ 371 (c)(1),
(2) Date: Mar. 12, 2019

(87) PCT Pub. No.: WO2019/114249
PCT Pub. Date: Jun. 20, 2019

(65) Prior Publication Data
US 2021/0364834 A1    Nov. 25, 2021

(30) Foreign Application Priority Data
Dec. 13, 2017 (CN) .......................... 201711326652.4

(51) Int. Cl.
*G02F 1/1334* (2006.01)
*G02F 1/1335* (2006.01)
(Continued)

(52) U.S. Cl.
CPC .......... *G02F 1/1334* (2013.01); *G02F 1/1362* (2013.01); *G02F 1/13439* (2013.01);
(Continued)

(58) Field of Classification Search
CPC ............. G02F 1/1334; G02F 1/133553; G02F 2203/02
See application file for complete search history.

(56) References Cited

U.S. PATENT DOCUMENTS

2006/0077321 A1   4/2006   Ukawa
2009/0219474 A1   9/2009   Chu
(Continued)

FOREIGN PATENT DOCUMENTS

CN   1714311 A   12/2005
CN   1749821 A   3/2006
(Continued)

OTHER PUBLICATIONS

Office Action dated May 15, 2020 issued in counterpart Chinese Application No. 201711326652.4 (w/ English machine translation; 19 pages).
(Continued)

*Primary Examiner* — Jia X Pan
(74) *Attorney, Agent, or Firm* — WHDA, LLP

(57) ABSTRACT

An array substrate, a method of driving an array substrate, a method of fabricating and array substrate, and a display panel including an array substrate are provided. The array substrate includes a base substrate, a first electrode and a second electrode on the base substrate, a polymer-dispersed liquid crystal layer between the first electrode and the
(Continued)

second electrode, and a reflective layer on a side of the polymer-dispersed liquid crystal layer opposite from the base substrate. The polymer-dispersed liquid crystal layer is configured to switch between a transparent state and an opaque state in accordance with a voltage applied between the first electrode and the second electrode.

17 Claims, 11 Drawing Sheets

(51) Int. Cl.
    *G02F 1/1343* (2006.01)
    *G09G 3/36* (2006.01)
    *G02F 1/1362* (2006.01)

(52) U.S. Cl.
    CPC .. *G02F 1/133514* (2013.01); *G02F 1/133553* (2013.01); *G09G 3/3648* (2013.01)

(56) References Cited

U.S. PATENT DOCUMENTS

| 2010/0060825 | A1* | 3/2010 | Jang | G02F 1/13476 |
| | | | | 349/86 |
| 2011/0128264 | A1 | 6/2011 | Lee et al. | |
| 2016/0033819 | A1* | 2/2016 | Li | G02F 1/1362 |
| | | | | 349/46 |
| 2017/0269401 | A1 | 9/2017 | Qin et al. | |

FOREIGN PATENT DOCUMENTS

| CN | 101673525 | A | | 3/2010 |
| CN | 103309103 | A | | 9/2013 |
| CN | 105223725 | A | | 1/2016 |
| EP | 3410179 | A1 | | 12/2018 |
| JP | 2017-134329 | A | | 8/2017 |
| KR | 20080053625 | A | * | 6/2008 |

OTHER PUBLICATIONS

Search Report and Written Opinion, dated Nov. 29, 2018, issued in counterpart International Application No. PCT/CN2018/093132 (11 pages; in English).

Office Action dated Dec. 31, 2019 issued in counterpart Chinese Application No. 20171 1326652.4 (w/ English machine translation; 19 pages).

* cited by examiner

Apply voltage to first electrode and second electrode, to induce polymer-dispersed liquid crystal layer into a transparent state. Light emitted by backlight passes through reflective layer and polymer-dispersed liquid crystal layer. External incident light is reflected by reflective layer.

OR

No voltage is applied to first electrode and second electrode, to induce polymer-dispersed liquid crystal layer into scattering state. External incident light is reflected through reflective layer and polymer-dispersed liquid crystal layer.

FIG. 7

ARRAY SUBSTRATE, METHOD OF DRIVING ARRAY SUBSTRATE, METHOD OF FABRICATING ARRAY SUBSTRATE, AND DISPLAY PANEL

CROSS-REFERENCE TO RELATED APPLICATIONS

This application claims the benefit of the filing date of Chinese Patent Application No. 201711326652.4 filed on Dec. 13, 2017, the entire disclosure of which is hereby incorporated by reference.

TECHNICAL FIELD

The present disclosure generally relates to the field of display technology. The present disclosure relates to an array substrate, a method of driving an array substrate, a method of fabricating an array substrate, and a display panel including the array substrate.

BACKGROUND

With increasing popularization of the liquid crystal display (LCD) technology come increasing demands and requirements, including display quality. In particular, there is a growing demand for display technologies that can maintain excellent display quality in a variety of environments, including in an outdoor setting with bright light and in in door or dark settings with low light.

BRIEF SUMMARY

One embodiment of the present disclosure is an array substrate. The array substrate may comprise a base substrate, a first electrode and a second electrode on the base substrate, a polymer-dispersed liquid crystal layer between the first electrode and the second electrode, and a reflective layer on a side of the polymer-dispersed liquid crystal layer opposite from the base substrate. The polymer-dispersed liquid crystal layer may be configured to switch between a transparent state and an opaque state in accordance with a voltage applied between the first electrode and the second electrode.

In at least some embodiments, the first electrode, the polymer-dispersed liquid crystal layer, and the second electrode are patterned, and the patterns of the first electrode, the polymer-dispersed liquid crystal layer, and the second electrode may correspond to each other. More particularly, the first electrode, the polymer-dispersed liquid crystal layer, and the second electrode are patterned, and the patterns of the first electrode, the polymer-dispersed liquid crystal layer, and the second electrode may correspond to each other in a stack direction of the array substrate.

In at least some embodiments, each of the first electrode and the second electrode may comprise a transparent conductive material. Each of the first electrode and the second electrode may comprise indium tin oxide or graphene.

In at least some embodiments, the reflective layer may comprise a metal reflective layer and a plurality of through-holes in the metal reflective layer. The plurality of through-holes may be arranged in an array.

In at least some embodiments, the reflective layer may comprise a metal reflective layer and a plurality of gaps in the metal reflective layer.

In at least some embodiments, a ratio of a total area of the plurality of the metal reflective layer and a total cross-sectional area of openings of the plurality of through-holes may be from 1:1 to 1:3.

In at least some embodiments, the array substrate may further comprise a thin film transistor component. The thin film transistor component may be provided in a region of the array substrate that does not overlap with the first electrode, the polymer-dispersed liquid crystal layer, the reflective layer, and the second electrode.

In at least some embodiments, the array substrate may further comprise a flattening layer on the second electrode.

Another embodiment of the present disclosure is a display panel. The display may comprise an array substrate as described above. In at least some embodiments, the display panel may further comprise a color filter substrate and a liquid crystal layer between the array substrate and the color filter substrate.

In at least some embodiments, the display panel may further comprise a backlight. The backlight may be on a side of the base substrate opposite from the reflective layer.

Another embodiment of the present disclosure is a method of driving an array substrate as described above. The method may comprise controlling a voltage applied to the first electrode and the second electrode to switch the polymer-dispersed liquid crystal layer between the transparent state and the opaque state.

In at least some embodiments, when an intensity of an external light is smaller than an intensity of light emitted by a backlight, the method may comprise applying the voltage to the first electrode and the second electrode, so as to switch the polymer-dispersed liquid crystal layer into the transparent state, and when the intensity of the external light is larger than the intensity of the light emitted by the backlight, the method may comprise terminating the voltage applied to the first electrode and the second electrode, so as to switch the polymer-dispersed liquid crystal into the opaque state.

Another embodiment of the present disclosure is a method of fabricating an array substrate as described above. The method may comprise forming a first electrode on a base substrate; forming a polymer-dispersed liquid crystal layer on the first electrode; forming a reflective layer on the polymer-dispersed liquid crystal layer; and forming a second electrode on the reflective layer. In at least some embodiments, a pattern of the first electrode, a pattern of the polymer-dispersed liquid crystal layer, and a pattern of the second electrode, may correspond to each other. The pattern of the first electrode, the pattern of the polymer-dispersed liquid crystal layer, and the pattern of the second electrode, may correspond to each other in a stack direction of the array substrate.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the present disclosure are apparent from the following detailed description taken in conjunction with the accompanying drawings in which:

FIG. 7 shows a flow chart of a method of driving an array substrate according to an embodiment of the present disclosure;

DETAILED DESCRIPTION

Figure 1:
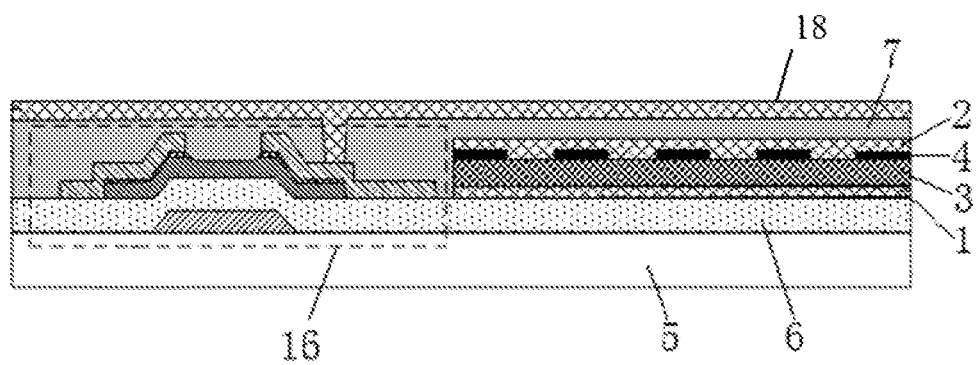
FIG. 1 shows a schematic diagram of an array substrate according to an embodiment of the present disclosure.

Next, the embodiments of the present disclosure will be described clearly and concretely in conjunction with the accompanying drawings, which are described briefly above. The subject matter of the present disclosure is described with specificity to meet statutory requirements. However, the description itself is not intended to limit the scope of this disclosure. Rather, the inventors contemplate that the claimed subject matter might also be embodied in other ways, to include different steps or elements similar to the ones described in this document, in conjunction with other present or future technologies.

While the present technology has been described in connection with the embodiments of the various figures, it is to be understood that other similar embodiments may be used or modifications and additions may be made to the described embodiments for performing the same function of the present technology without deviating therefrom. Therefore, the present technology should not be limited to any single embodiment, but rather should be construed in breadth and scope in accordance with the appended claims. In addition, all other embodiments obtained by one of ordinary skill in the art based on embodiments described in this document are considered to be within the scope of this disclosure.

Conventional liquid crystal display (LCD) devices are commonly classified into transmissive LCD devices using backlight units as the light source and reflective LCD devices using natural light as the light source. Since the transmissive LCD device employs the backlight unit to generate light, it can display bright images in dark places. However, the use of a backlight unit may increase power consumption. On the other hand, the reflective LCD uses natural light as a light source without employing the backlight unit, so it can display images with low power consumption. However, the reflective LCD device cannot be used under low light conditions or in dark places.

To maintain viewability of a display under a wide range of lighting conditions, a transflective LCD device has been suggested. A transflective LCD device can be selectively used as a transmissive LCD device or a reflective LCD device, depending on the environment in which the device is operating, so that a transflective LCD device can be used to display clear, crisp, high-quality images under a myriad of conditions. Transflective LCD devices thus have advantages such as low power consumption and strong adaptability to ambient light conditions.

In a conventional transflective array substrate, the pixel region includes a reflective region and a transmissive region. The reflective region commonly includes a reflective metal layer containing undulating microstructures. Such a reflective metal layer can increase the reflectivity of the reflective region vis-a-vis external light, but dividing the pixel region into separate reflective and transmission regions can cause uneven brightness in the pixel region, which can in turn reduce the display quality of the display panel. In addition, the undulating microstructures in the reflective region can produce or increase unevenness in the array substrate, which can in turn further compromise the quality of the display on the display panel.

In embodiments of the present disclosure, an array substrate comprises a polymer-dispersed liquid crystal layer, which is configured to switch between a transparent state and a scattering state in accordance with the electric field around the polymer-dispersed liquid crystal layer. When an electric field is applied (for example, under low light conditions when external light intensity is smaller than that of the backlight), the polymer-dispersed liquid crystal layer is induced into the transparent state. In the present disclosure, "transparent state" means that the polymer-dispersed liquid crystal layer is capable of transmitting light, so that light transmittance is high, for example, as high as 80%. Light emitted by the backlight can pass through the liquid crystal layer and the reflective layer to generate a transmissive display. When backlight is not needed (for example, under bright light conditions when external light intensity is larger than that of the backlight), the electric field is removed, which induces the polymer-dispersed liquid crystal layer into the opaque, scattering state. In the present disclosure, "opaque state" means that the polymer-dispersed liquid crystal layer scatters a majority of the light, so that light transmittance is low, for example, as low as 20%. External incident light is reflected by the reflective layer, and is diffusely reflected by the polymer-dispersed liquid crystal layer. As a result, a reflective display is generated. As compared to conventional LCD technologies, in the embodiments according to the present disclosure, the arrangement of the reflective layer and the polymer-dispersed liquid crystal layer in the same region of the array substrate makes it possible to switch between transmissive display and reflective display, which can improve the uniformity of the pixel imaging and subsequently, the quality of the display. In addition, embodiments according to the present disclosure involve simple construction and remove the need for complex assembly of subcomponents, for example, undulating microstructures that may be of uneven heights. As such, the present disclosure is able to greatly reduce the unevenness in the thin film transistor array substrate, further improving the quality of the resulting display.

As shown in FIGS. 1 to 4, the array substrate includes a base substrate 5, a first electrode 1, a second electrode 2, a polymer-dispersed liquid crystal layer 3, and a reflective layer 4. The polymer-dispersed liquid crystal layer 3 is disposed between the first electrode 1 and the second electrode 2. The reflective layer 4 is disposed between the first electrode 1 and the second electrode 2. The reflective surface of the reflective layer 4 faces away from the base substrate 5, for example, as shown in FIGS. 1 and 3-6.

The polymer-dispersed liquid crystal layer 3 is formed by mixing and polymerizing low molecular weight liquid crystals and prepolymers to produce micro-sized liquid crystal droplets that are uniformly dispersed in the polymer matrix. The polymerization conditions are adjusted as appropriate in any manner known to a person of ordinary skill in the art.

The resulting liquid crystal material has strong optical and dielectric anisotropy characteristics. Such characteristics can be manipulated to produce materials with the desirable optoelectronic properties. The liquid crystal material switches between a scattering state and a transparent state, and possess a stable gray-scale level. By subjecting the polymer-dispersed liquid crystal layer to an external voltage, the orientation of the optical axis of each liquid crystal droplet can be controlled. Normally, the optical axes of all the liquid crystals fluctuate and are orientationally disordered. Liquid crystals as a material have strong optical and dielectric anisotropy, and usually have an effective refractive index that does not match the refractive index of the substrate on which the liquid crystal layer is formed, so as to be capable of strong scattering of external incident light.

The transparent and scattering states of the polymer-dispersed liquid crystal layer are controlled by the electric field between the first electrode and the second electrode (in other words, on the surface of the polymer-dispersed liquid crystal layer facing the second electrode, and on the surface of the polymer-dispersed liquid crystal layer facing the first electrode). When the polymer-dispersed liquid crystal layer is in the transparent state, reflection of external incident light by the reflective layer enhances the viewability, under bright light conditions, of a display incorporating the array substrate of the present disclosure. When there is sufficient ambient light to obviate the need for the backlight, the electric field between the first electrode and the second electrode is removed, and the polymer-dispersed liquid crystal layer is in the scattering state. In addition to being reflected by the reflective layer, external incident light is also scattered by portions of the polymer-dispersed liquid crystal layer that are not covered by the reflective layer (that is, the portions of the polymer-dispersed liquid crystal layer facing the through-holes in the reflective layer). The combination of reflective layer and polymer-dispersed liquid crystal layer enhance the reflection effect, which can in turn improve the display quality of a display panel incorporating the array substrate of the present disclosure.

The reflective layer 4 comprises a reflective metal layer. The reflective layer 4 is disposed between the second electrode 2 and the polymer-dispersed liquid crystal layer 3. The reflective layer 4 is provided with a plurality of through-holes 41. In some embodiments, the reflective layer 4 is provided with a plurality of gaps instead of through-holes 41. More particularly, when an array substrate according to the present disclosure is applied to a display panel of the twisted nematic (TN) mode, the reflective layer 4 is provided with a plurality of through-holes 41. When an array substrate according to the present disclosure is applied to a display panel of other modes, for example, the advanced dimensional switch (ADS) mode or the high resolution ADS (HADS) mode, the reflective layer 4 is provided with a plurality of gaps.

When an external electric field is applied to the polymer-dispersed liquid crystal layer 3, the liquid crystals rearrange themselves so that the optical axes of the liquid crystals are uniformly oriented in the direction of the electric field, and the refractive indices of the liquid crystals substantially match the refractive index of the substrate on which the liquid crystal layer is formed. The substrate is transparent and light can pass through. When an electric field having a certain intensity is applied between the first electrode 1 and the second electrode 2, the polymer-dispersed liquid crystal layer 3 can be induced into a transparent state, and light emitted by the backlight can pass through the polymer-dispersed liquid crystal 3 and the through-holes 41 (or gaps) in the reflective layer 4, so as to achieve a transmissive display. Under bright light conditions, external incident light is irradiated onto the reflective layer 4, and then reflected back outward by the reflective layer 4 (for example, by the metal layer in the refractive layer 4), which can in turn improve the viewability of the display under bright light conditions. When the backlight and the electric field between the first electrode 1 and the second electrode 2 are turned off, the polymer-dispersed liquid crystal layer 3 can be induced into an opaque, scattered state. External incident light is reflected by the reflective layer 4, and also diffuse-reflected by the polymer-dispersed liquid crystal layer 3, so as to achieve a reflective display.

The array substrate according to the present disclosure makes it possible to switch the polymer-dispersed liquid crystal layer between the transparent state and the opaque, scattering state by controlling the external electric field applied between the first electrode and the second electrode. When an external electric field is applied between the first electrode and the second electrode, the polymer-dispersed liquid crystal layer is induced into a transparent state, and light emitted by the backlight can pass through the polymer-dispersed liquid crystal layer and the through-holes (or gaps) in the reflective layer, so as to generate a transmissive display. When backlight is not needed, the electric field between the first electrode and the second electrode is removed, and the polymer-dispersed liquid crystal layer is induced into an opaque, scattering state. External incident light is reflected outward by the reflective layer, and also diffuse-reflected by the polymer-dispersed liquid crystal layer, so as to generate a reflective display. The array substrate according to the present disclosure thus makes it possible to produce uniform display in the pixel region, and improve the quality of the display. Further, embodiments according to the present disclosure involve simple construction and remove the need for complex assembly of subcomponents, for example, undulating microstructures, which may be of uneven heights. As such, the present disclosure is able to greatly reduce the unevenness in the array substrate, further improving the quality of the resulting display.

The reflective layer 4 may be disposed between the second electrode 2 and the polymer-dispersed liquid crystal layer 3, for example, as shown in FIG. 1. This arrangement of the reflective layer 4 makes it possible for external incident light to pass through the color filter substrate (not shown in the figures) and the polymer dispersed liquid crystal layer 3 to be directly irradiated onto, and subsequently reflected by, the reflective layer 4. This in turn maintains the amount of reflected light, which could otherwise have become attenuated as a result of having to pass through the polymer-dispersed liquid crystal layer 3 twice. Embodiments of the present disclosure thus advantageously preserve the viewability of a display even under bright light conditions, so as to improve the quality of the display.

Figure 2:
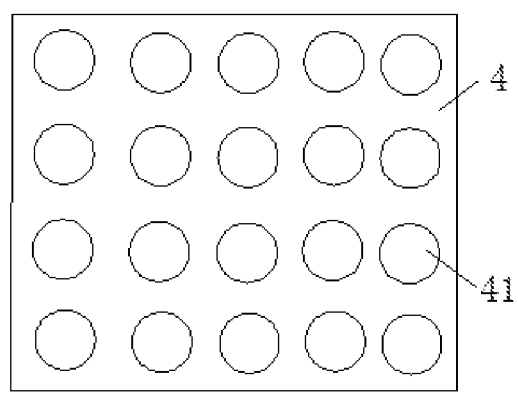
FIG. 2 shows a schematic diagram of a top view of a reflective layer in the embodiment of the array substrate illustrated in FIG. 1.
Figure 3:
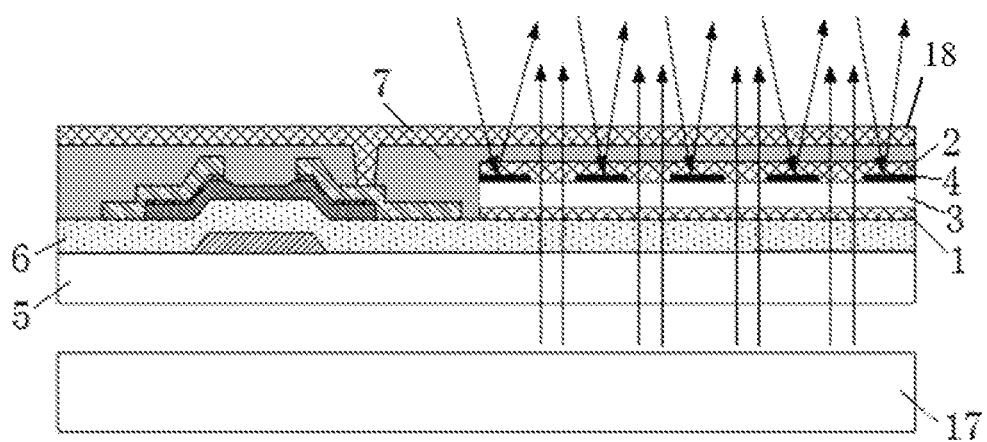
FIG. 3 shows a schematic diagram of the embodiment of the array substrate illustrated in FIG. 1, showing the polymer-dispersed liquid crystal layer in a transparent state and the transmission of light from a backlight and the reflection of external incident light.
Figure 4:
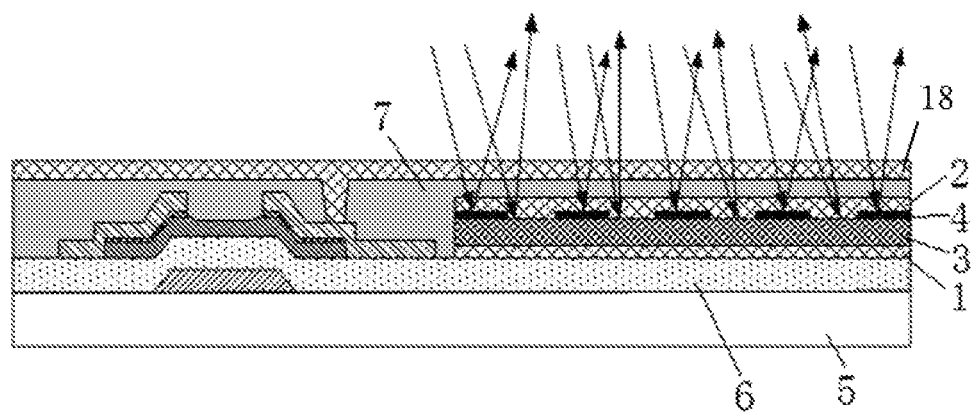
FIG. 4 shows a schematic diagram of the embodiment of the array substrate illustrated in FIG. 1, showing the polymer-dispersed liquid crystal layer in an opaque, scattering state and the reflection of external incident light.

A plurality of through-holes 41 are provided in the reflective layer 4, for example, as shown in FIG. 2. The through-holes 41 may be arranged in an array in the manner shown in FIG. 2, or in any appropriate arrangements known to a person of ordinary skill in the art. The shape of the through-holes 41 may be circular, square, or any other appropriate geometry known to a person of ordinary skill in the art. In some embodiments, the reflective layer 4 is provided with a plurality of gaps instead of through-holes 41. More particularly, when an array substrate according to the present disclosure is applied to a display panel of the twisted nematic (TN) mode, the reflective layer 4 is provided with a plurality of through-holes 41. When an array substrate according to the present disclosure is applied to a display panel of other modes, for example, the advanced dimensional switch (ADS) mode or the high resolution ADS (HADS) mode, the reflective layer 4 is provided with a plurality of gaps.

The through-holes 41 (or gaps) define the exposed, non-reflective portions of the reflective layer 4, and the portions of the reflective layer 4 that do not have the through-holes 41 (or gaps) define the reflective portions of the reflective layer 4. The ratio of the total surface area of the reflective portions to the total surface area of the non-reflective portions is not particularly limited, and may be 1:1, 1:2, or 1:3. The ratio may be adjusted in any manner known to a person of ordinary skill in the art in order to obtain the desired display effects. The total surface area of the non-reflective portions is the sum of the cross-sectional areas of the openings of the through-holes 41 (or gaps).

The presence of the through-holes 41 (or gaps) allows external incident light to be uniformly irradiated through the reflective layer 4 onto the opaque-state polymer-dispersed liquid crystal layer 3. In addition, light emitted by the backlight can pass through the through-holes 41 (or gaps) and the transparent-state polymer-dispersed liquid crystal layer 3. Embodiments of the present disclosure thus make it possible to improve the uniformity of the reflected light.

The first electrode 1 and the second electrode 2 may each comprise a transparent conductive material. More particularly, each of the first electrode 1 and the second electrode 2 may comprise indium tin oxide, graphene, or the like. This can increase the transmissivity of the first electrode 1 and the second electrode 2, and avoid the attenuation of light emitted by the backlight and/or the external incident light as they pass through the first electrode 1 and the second electrode 2.

In at least some embodiments, the array substrate comprises an exposed region corresponding to the non-thin film transistor/non-wiring region. A display panel usually includes a wiring region and a thin film transistor region. The wiring region includes the circuit for driving the pixels of the display panel, and the circuit in turn usually includes gate lines, data lines, and control lines that act in concert to control the display. The wiring region and the TFT region are usually shielded, for example, by black matrix, in order to prevent leakage of light, thereby improving image quality. Conversely, regions of the array substrate that do not contain a thin film transistor and/or wiring are not so shielded, thus defining an "exposed" region on the array substrate. For example, as shown in FIG. 1, the surface of the base substrate 5 may be divided into a thin film transistor region and a non-thin film transistor/non-wiring ("non-TFT/wiring") region. The thin film transistor region corresponds to the location of the thin film transistor component 16. The first electrode 1, the second electrode 2, the polymer-dispersed liquid crystal layer 3, and the reflective layer 4 are disposed in the non-TFT/wiring region on the base substrate 5. The thin film transistor component is therefore provided in a region of the array substrate that does not overlap with the first electrode, the polymer-dispersed liquid crystal layer, the reflective layer, and the second electrode. As such, the arrangement of the first electrode 1, the second electrode 2, the polymer-dispersed liquid crystal layer 3, and the reflective layer 4 in the non-TFT/wiring region makes it possible to further improve the transmissivity of the array substrate.

The transmissivity of the array substrate is further improved by forming a plurality of through-holes 41 (or gaps) in the reflective layer 4.

As shown in FIG. 1, the array substrate further comprises a first base substrate 5 and a first gate insulating layer 6. The first electrode 1, the polymer-dispersed liquid crystal layer 3, the reflective layer 4, and the second electrode 2 are arranged, in this order, on a side of the first gate insulating layer 6 opposite from the first base substrate 5.

The array substrate may further comprise a first flattening layer 7. The first flattening layer 7 may be disposed on a side of the second electrode 2 opposite from the reflective layer 4, for example, as shown in FIG. 1. In addition, the array substrate may further comprise a pixel electrode 18, which may be disposed on a side of the first flattening layer 7 opposite from the second electrode 2. In some embodiments, the second electrode 2 functions as a common electrode for the polymer-dispersed liquid crystal layer 3. The second electrode 2 is a grounded zero-potential electrode layer, and is configured to switch the polymer-dispersed liquid crystal layer 3 between the transparent and opaque states by the voltage applied by the first electrode 1. In such embodiments, even when the pixel electrode 18 is electrically charged, causing inductive coupling of the second electrode 2, the transmissivity of the polymer-dispersed liquid crystal layer 3 will be unaffected.

Figure 6:
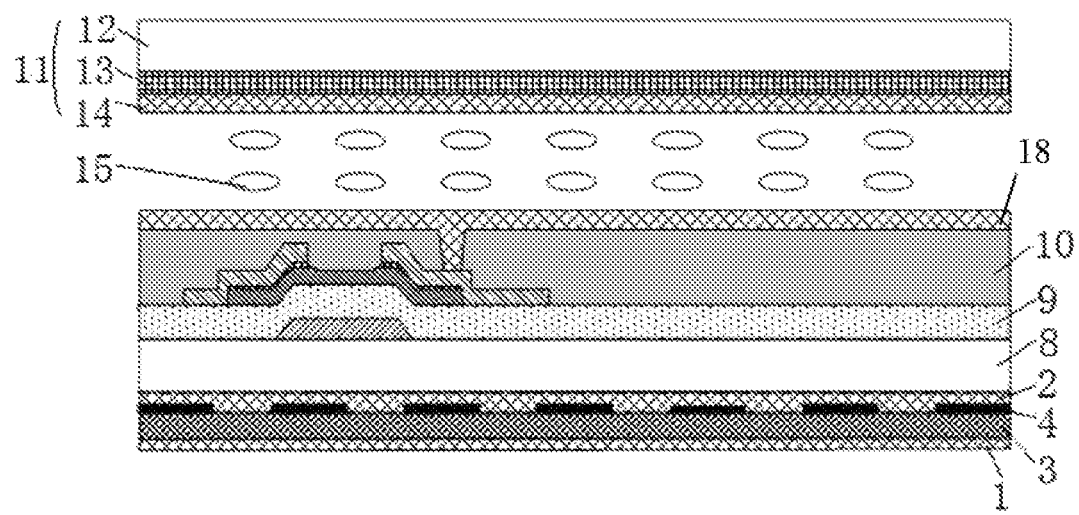
FIG. 6 shows a schematic diagram of a liquid crystal display according to another embodiment of the present disclosure.

As shown in FIG. 6, in another embodiment of the present disclosure, the array substrate may further comprise a second base substrate 8 and a second gate insulating layer 9. The first electrode 1, the polymer-dispersed liquid crystal layer 3, the reflective layer 4, and the second electrode 2 are arranged, in this order, on a side of the second base substrate 8 opposite from the second gate insulating layer 9. The array substrate may further comprise a second flattening layer 10, which may be disposed on a side of the second gate insulting layer 9 opposite from the second base substrate 8.

Figure 5:
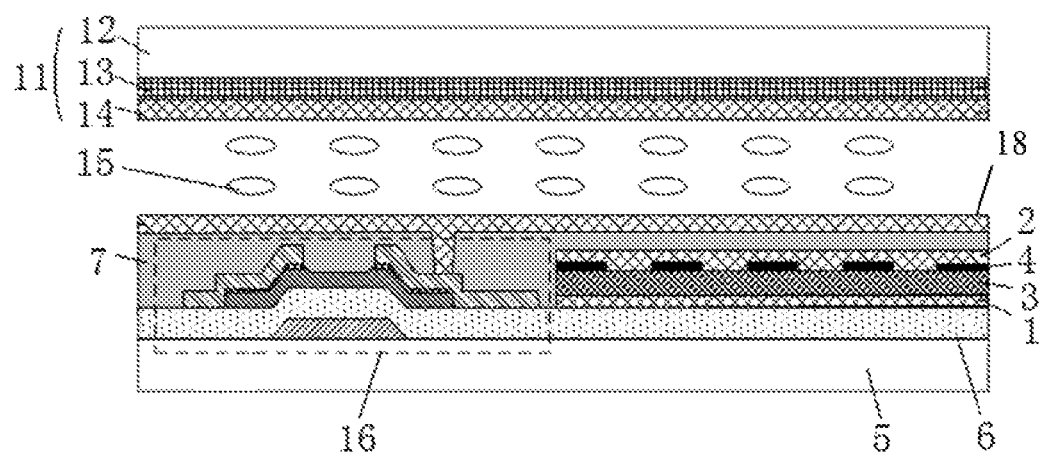
FIG. 5 shows a schematic diagram of a liquid crystal display according to an embodiment of the present disclosure.

The present disclosure also provides a display panel, for example, a liquid crystal display panel, that comprises an array substrate as described above. As shown in FIG. 5, the display panel comprises an array substrate as described above, and a color filter substrate 11. The color filter substrate 11 comprises a color filter substrate base layer 12, a color resist layer 13, a common electrode 14, and a liquid crystal layer 15 that is disposed between the array substrate and the color filter substrate 11.

In a display panel incorporating the array substrate according to the present disclosure, the polymer-dispersed liquid crystal layer in the array substrate can be configured to switch between the transparent state and the opaque, scattering state by controlling the external electric field between the first electrode and the second electrode. When an external electric field is applied between the first electrode and the second electrode, the polymer-dispersed liquid crystal layer is induced into a transparent state, and light emitted by the backlight can pass through the polymer-dispersed liquid crystal layer and the through-holes (or gaps) in the reflective layer, so as to generate a transmissive display. When backlight is not needed, the electric field between the first electrode and the second electrode is removed, and the polymer-dispersed liquid crystal layer is induced into an opaque, scattering state. External incident light is reflected outward by the reflective layer, and also diffuse-reflected by the polymer-dispersed liquid crystal layer, so as to generate a reflective display. The array substrate according to the present disclosure thus makes it possible to produce uniform display in the pixel region, and improve the quality of the display. Further, embodiments according to the present disclosure involve simple construction and remove the need for complex assembly of subcomponents, for example, undulating microstructures, which may be of uneven heights. As such, the present disclosure is able to greatly reduce the unevenness in the thin film transistor array substrate, further improving the quality of the resulting display.

Moreover, the display panel according to the present disclosure does not require an alignment layer or a polarizer. The simplicity of the display panel's construction improves its manufacturability and versatility, as well as applicability in a wide range of uses, including, for example, in light valve, grating, projector, tablets, smart glass, and other display and/or electronic products.

The present disclosure also provides a method of driving an array substrate, and particularly, a method of driving an array substrate. FIG. 7 shows a flow chart of a method of driving an array substrate according to an embodiment of the present disclosure.

As shown in FIG. 7, in step 101, the method comprises applying a voltage to the first electrode and the second electrode. This produces an electric field between the first electrode and the second electrode. The polymer-dispersed liquid crystal layer is induced into a transparent state, and light emitted by the backlight can pass through the polymer-dispersed liquid crystal layer and the reflective layer. External incident light is reflected outward by the reflective layer.

When no voltage is applied to the first electrode and the second electrode, the polymer-dispersed liquid crystal layer is induced into an opaque, scattering state. When the array substrate is incorporated in a display panel, external incident light is reflected through the reflective layer and the polymer-dispersed liquid crystal layer. External incident light enters from the display side (that is, the viewer side) of the array substrate, and the external incident light passes through the color filter substrate and the liquid crystal layer to be irradiated onto and reflected by the reflective layer.

When a display incorporating an array substrate according to the present disclosure is operating under normal light conditions, a voltage may be applied to the first electrode 1 and the second electrode 2, which induces the polymer-dispersed liquid crystal layer 3 into a transparent state. Light emitted by the backlight passes through the polymer-dispersed liquid crystal layer 3, and a transmissive display is generated. Further, when the display incorporating an array substrate according to the present disclosure is operating under strong light conditions, external incident light passes through the color filter substrate 11 and the liquid crystal layer 15 to be irradiated onto the reflective layer 4, and is reflected outward by the reflective layer 4. This can improve the viewability of the display under bright light conditions.

Under bright light conditions, when backlight is not necessary (for example, in order to be more energy-efficient), a voltage is not applied to the first electrode 1 and the second electrode 2. Liquid crystals as a material have strong optical and dielectric anisotropy, and usually have an effective refractive index that does not match the refractive index of the substrate on which the liquid crystal layer is formed, so as to be capable of strong scattering of external incident light. Further, external incident light passes through the color filter substrate 11 and the liquid crystal layer 15 to be irradiated onto the reflective layer 4, and is reflected outward by the reflective layer 4. The polymer-dispersed liquid crystal layer 3, in the opaque, scattering state, can diffuse-reflect external incident light through the through-holes 41 (or gaps) in the reflective layer. This can increase the uniformity of the reflected light, and improve the quality of the resulting display.

In other words, when an intensity of an external light is smaller than an intensity of light emitted by a backlight, the method comprises applying the voltage to the first electrode and the second electrode, so as to switch the polymer-dispersed liquid crystal layer into the transparent state. Conversely, when the intensity of the external light is larger than the intensity of the light emitted by the backlight, the method comprises terminating the voltage applied to the first electrode and the second electrode, so as to switch the polymer-dispersed liquid crystal into the opaque state.

The voltage applied to the first electrode 1 and the second electrode 2 may be adjusted in any manner known to a person of ordinary skill in the art to achieve the desired degree of transparency of the polymer-dispersed liquid crystal layer 3. By controlling the degree of transparency of the polymer-dispersed liquid crystal layer 3, it is possible to optimize the viewing experience for a viewer.

The present disclosure also provides a method of fabricating an array substrate, and particularly, a method of fabricating an array substrate as described above.

Figure 8:
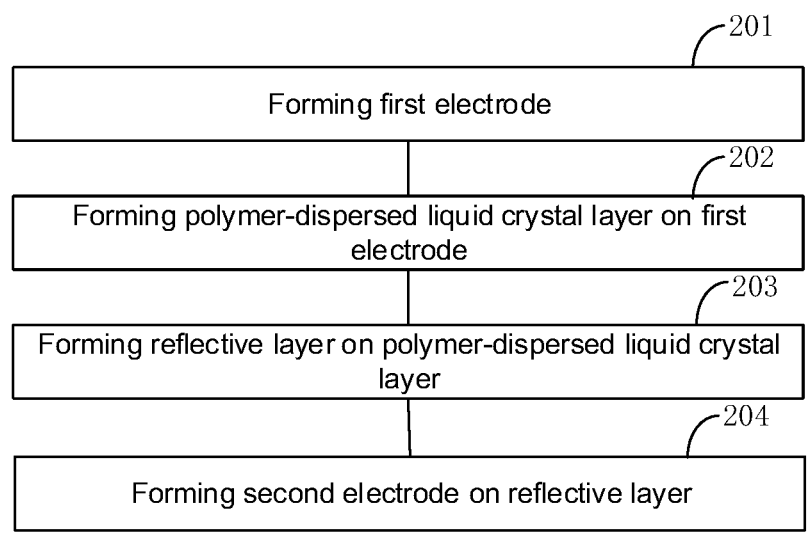
FIG. 8 shows a flow chart of a method of fabricating an array substrate according to an embodiment of the present disclosure.

As shown in FIG. 8, in step 201, the first electrode is formed. The first electrode 1 may be formed as a strip. The first electrode 1 may be composed of a transparent conductive material, which can improve the transparency of the first electrode 1 and to avoid the attenuation of light emitted by the backlight as it passes through the first electrode 1. More particularly, the first electrode 1 may be composed of indium tin oxide, graphene, or the like. The first electrode 1 may be formed by any appropriate process known to a person of ordinary skill in the art, for example, by film formation (for instance, chemical vapor deposition), by photolithography, or by etching.

In step 202, the polymer-dispersed liquid crystal layer is formed on the first electrode.

In step 203, the reflective layer is formed on the polymer-dispersed liquid crystal layer. The reflective layer 4 may comprise a reflective metal layer. The reflective layer may be formed by any appropriate process known to a person of ordinary skill in the art, for example, by film formation (for instance, chemical vapor deposition), by photolithography, or by etching.

The reflective layer 4 is patterned to form a plurality of through-holes 41 (or gaps) in the reflective layer 4. When the reflective layer 4 is provided with through-holes, the shape of the through-holes 41 may be circular, square, or any other appropriate geometry known to a person of ordinary skill in the art. The through-holes 41 (or gaps) define the exposed portion of the reflective layer 4, and the portions of the reflective layer 4 that do not have the through-holes 41 (or gaps) define the reflective portion of the reflective layer 4. The ratio of the total surface area of the reflective portion to the total surface area of the exposed portion is not particularly limited, and may be 1:1, 1:2, or 1:3. The ratio may be adjusted in any manner known to a person of ordinary skill in the art in order to obtain the desired display effects. The total surface area of the exposed portion is the sum of the cross-sectional areas of the openings of the through-holes 41 (or gaps). The through-holes 41 (or gaps) may be uniformly distributed in the reflective layer 4, for example, in an array (for example, as shown in FIG. 2) or in any appropriate arrangements known to a person of ordinary skill in the art. A uniform distribution of the through-holes (or gaps) allows external incident light to be more uniformly irradiated onto the reflective layer and the opaque-state polymer-dispersed liquid crystal layer. In addition, a uniform distribution of the through-holes (or gaps) allows light emitted by the backlight to more uniformly pass through the through-holes (or gaps) and the transparent-state polymer-dispersed liquid crystal layer. Thus, the arrangement of the through-holes (or gaps) can be configured to improve the uniformity of the reflected external incident light.

In step 204, the second electrode is formed on the reflective layer. The second electrode 2 may be formed as a strip. The second electrode 2 may be composed of a transparent conductive material, which can improve the transparency of the second electrode 2 and to avoid the attenuation of light emitted by the backlight or reflected external incident light as they pass through the second electrode 2. More particularly, the second electrode 2 may be composed of indium tin oxide, graphene, or the like. The second electrode 2 may be formed by any appropriate process known to a person of ordinary skill in the art, for example, by film formation (for instance, chemical vapor deposition), by photolithography, or by etching.

The present disclosure provides a method of fabricating an array substrate, in which the polymer-dispersed liquid crystal layer can be made to switch between a transparent state and an opaque, scattering state by controlling the applied electric field between the first electrode and the second electrode. When an electric field is applied between the first electrode and the second electrode, the polymer-dispersed liquid crystal layer is induced into a transparent state. Light emitted by the backlight is able to pass through the polymer-dispersed liquid crystal layer and the through-holes (or gaps) in the reflective layer. As a result, a transmissive display is produced. When backlight is not needed, the electric field between the first electrode and the second electrode is removed, which induces the polymer-dispersed liquid crystal layer into an opaque, scattering state. External incident light is reflected outward by the reflective layer, and is also diffuse-reflected by the polymer-dispersed liquid crystal layer. As a result, a reflective display is produced. Unlike conventional technologies, in the embodiments according to the present disclosure, the arrangement of the polymer-dispersed liquid crystal layer and the reflective layer in the same region of the array substrate makes it possible to switch the mode of display between a transmissive display and a reflective display. In turn, the uniformity of the image generated by the pixel region is improved, as is the quality of the resulting display. Further, since the construction of the array substrate according to the present disclosure forgoes undulating microstructures, it is possible to reduce the unevenness in the thin film transistor array substrate, which can further improve display quality.

FIGS. 9A-9F and 10 show a method of fabricating an array substrate according to another embodiment of the present disclosure.

Figure 9A:
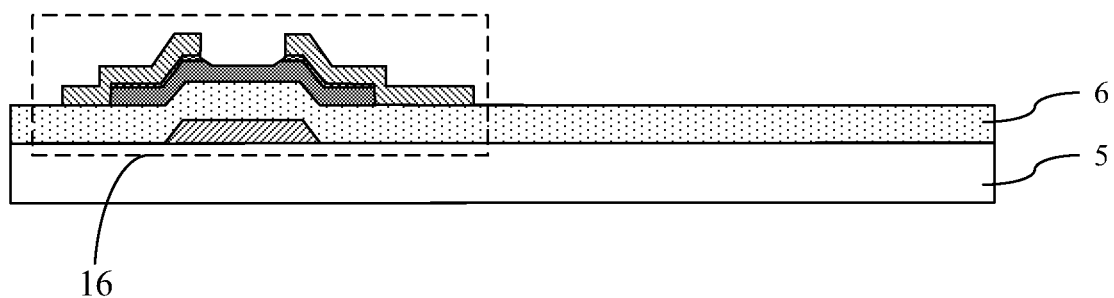
FIGS. 9A to 9F show a schematic diagram of a method of fabricating an array substrate according to another embodiment of the present disclosure.

In step 301, a substrate is formed. The substrate comprises a gate insulating layer. As shown in FIG. 9A, the substrate may be an array substrate on which the thin film transistor structure 16 has been formed. The array substrate may comprise a base substrate 5 and a gate insulating layer 6 arranged in a stack.

Figure 9B:
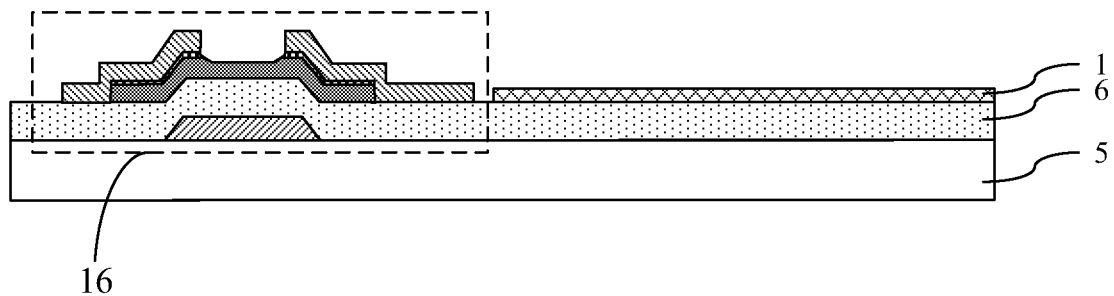

In step 302, a first electrode is formed on the gate insulating layer, for example, as shown in FIG. 9B.

The first electrode 1 may be composed of a transparent conductive material, which can improve the transparency of the first electrode 1 and to avoid the attenuation of light emitted by the backlight as it passes through the first electrode 1. The first electrode 1 may be composed of indium tin oxide, graphene, or the like.

As shown in FIGS. 9A-9F, the array substrate may comprise a non-thin film transistor/non-wiring region. For example, as shown in FIG. 1, the surface of the base substrate 5 may be divided into a thin film transistor region and a non-thin film transistor/non-wiring ("non-TFT/wiring") region. The thin film transistor region is defined by the location of the thin film transistor component 16. The first electrode 1, the second electrode 2, the polymer-dispersed liquid crystal layer 3, and the reflective layer 4 are disposed in the non-TFT/wiring region on the base substrate 5. As such, the arrangement of the first electrode 1, the second electrode 2, the polymer-dispersed liquid crystal layer 3, and the reflective layer 4 in the non-TFT/wiring region makes it possible to further improve the transmissivity of the array substrate.

To form the first electrode, a first electrode layer comprising the first electrode forming material is formed on the gate insulating layer. The first electrode layer is then patterned to produce the first electrode. The patterning process may comprise forming the first electrode on the gate insulating layer by a film-forming process, by photolithography, or by etching.

Figure 9C:
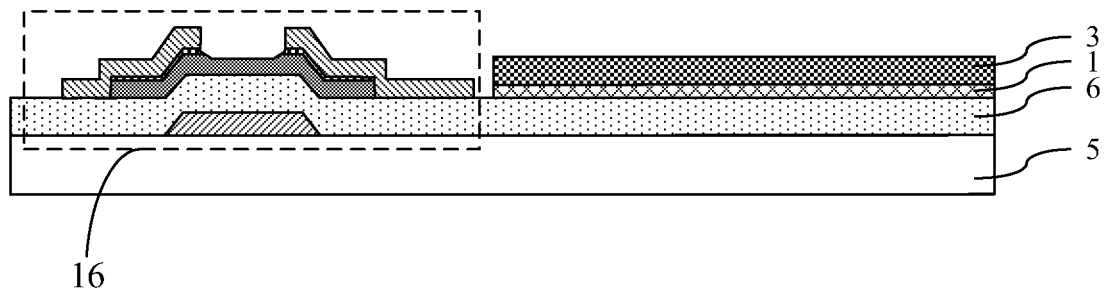

In step 303, a polymer-dispersed liquid crystal layer is formed on the first electrode, for example, as shown in FIG. 9C.

Liquid crystal material, acrylate oligomer, diluting monomer, photoinitiator, and surfactant are uniformly mixed and stirred to prepare a transparent solution of polymer-dispersed liquid crystal layer forming material. The transparent solution is then coated onto the first electrode to obtain a coating layer. The transparent solution may be coated by roller coating, blade coating, or any other appropriate coating method known to a person of ordinary skill in the art. The coating layer is then patterned to produce the polymer-dispersed liquid crystal layer. The patterning process for example, by photolithography or etching, is performed after forming the coating layer of polymer-dispersed liquid crystal layer. The pattern of the polymer-dispersed liquid crystal layer and the pattern of the first electrode correspond to each other in the stack direction of the array substrate. For example, as shown in FIG. 9C, the pattern of the polymer-dispersed liquid crystal layer correspond to the pattern of the first electrode in the stack direction of the array substrate. The patterning process may comprise subjecting the coating layer to an ultraviolet-curing treatment to obtain the polymer-dispersed liquid crystal layer. When the coating layer is subject to UV curing, the thin film transistor region of the array substrate should be protected, so as to prevent damages to the thin film transistor component.

In the array substrate of the present disclosure, the polymer-dispersed liquid crystal layer is formed in the non-TFT/wiring region of the array substrate. Patterning is therefore performed to avoid forming the polymer-dispersed liquid crystal in the TFT/wiring region of the array substrate. Overlapping of the polymer-dispersed liquid crystal layer and the TFT/wiring region of the array substrate may affect the thickness of the TFT/wiring region, and cause signal interference with the TFT and wiring to affect not only the transmissivity, but also the ability to control the transmissivity, of the polymer-dispersed liquid crystal layer.

Figure 9D:
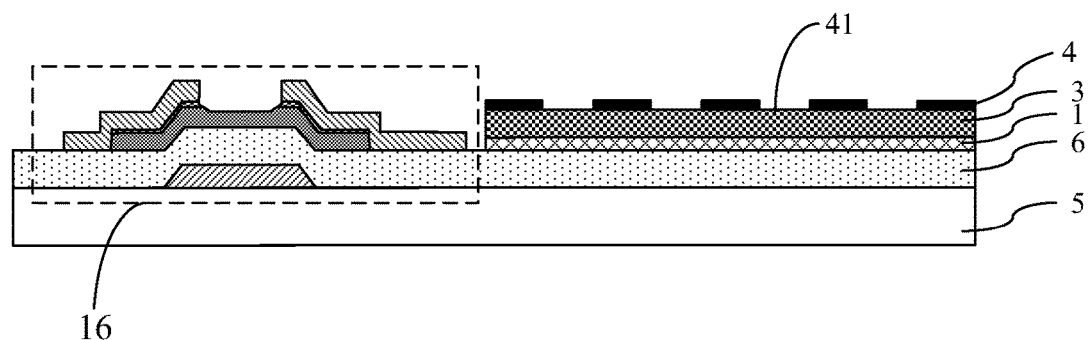

In step 304, a reflective layer is formed on the polymer-dispersed liquid crystal layer, for example, as shown in FIG. 9D. The reflective layer 4 may comprise a reflective metal layer. The reflective layer may be formed by any appropriate process known to a person of ordinary skill in the art, for example, by film formation (for instance, chemical vapor deposition), by photolithography, or by etching.

The reflective layer 4 is patterned to form a plurality of through-holes 41 (or gaps) in the reflective layer 4. When the reflective layer 4 is provided with through-holes 41, the shape of the through-holes 41 may be circular, square, or any other appropriate geometry known to a person of ordinary skill in the art.

The through-holes 41 (or gaps) define the exposed, non-reflective portion of the reflective layer 4, and the portions of the reflective layer 4 that do not have the through-holes 41 (or gaps) define the reflective portion of the reflective layer 4. The ratio of the total surface area of the reflective portion to the total surface area of the non-reflective portion is not particularly limited, and may be 1:1, 1:2, or 1:3. The ratio may be adjusted in any manner known to a person of ordinary skill in the art in order to obtain the desired display effects. The total surface area of the exposed portion is the sum of the cross-sectional areas of the openings of the through-holes 41 (or gaps). The through-holes 41 (or gaps) may be uniformly distributed in the reflective layer 4, for example, in an array (for example, as shown in FIG. 2) or in any appropriate arrangements known to a person of ordinary skill in the art. A uniform distribution of the through-holes (or gaps) allows external incident light to be more uniformly irradiated onto the reflective layer and the opaque-state polymer-dispersed liquid crystal layer. In addition, a uniform distribution of the through-holes (or gaps) allows light emitted by the backlight to more uniformly pass through the through-holes and the transparent-state polymer-dispersed liquid crystal layer. Thus, the arrangement of the through-holes (or gaps) can be configured to improve the uniformity of the reflected external incident light.

Figure 9E:
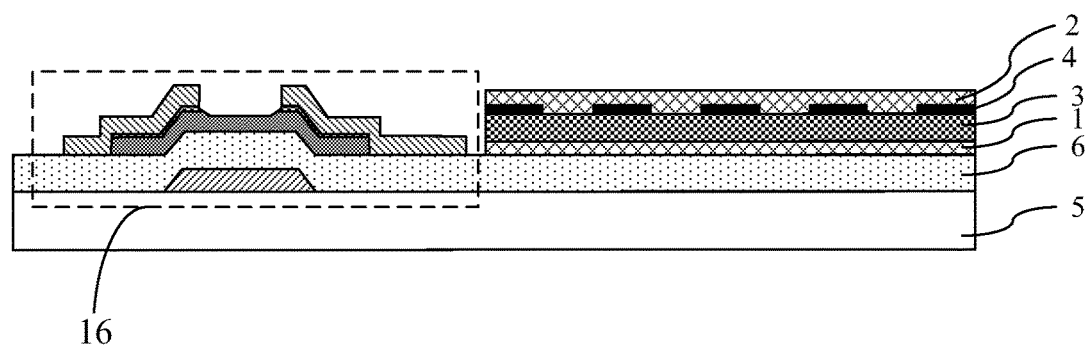

In step 305, a second electrode is formed on the reflective layer, for example, as shown in FIG. 9E. The second electrode 2 may be composed of a transparent conductive material, which can improve the transparency of the second electrode 2 and to avoid the attenuation of light emitted by the backlight as it passes through the second electrode 2. The second electrode 2 may be composed of indium tin oxide, graphene, or the like.

To form the second electrode 2, a second electrode layer comprising second electrode forming material is formed on the reflective layer. The second electrode layer is then patterned to produce the second electrode. In at least some embodiments, for example, as shown in FIG. 9E, the pattern of the first electrode, the pattern of the polymer-dispersed liquid crystal layer, and the pattern of the second electrode correspond to each other in the stack direction of the array substrate (also as shown in FIGS. 1, 3, 4, 5, and 6).

Figure 9F:
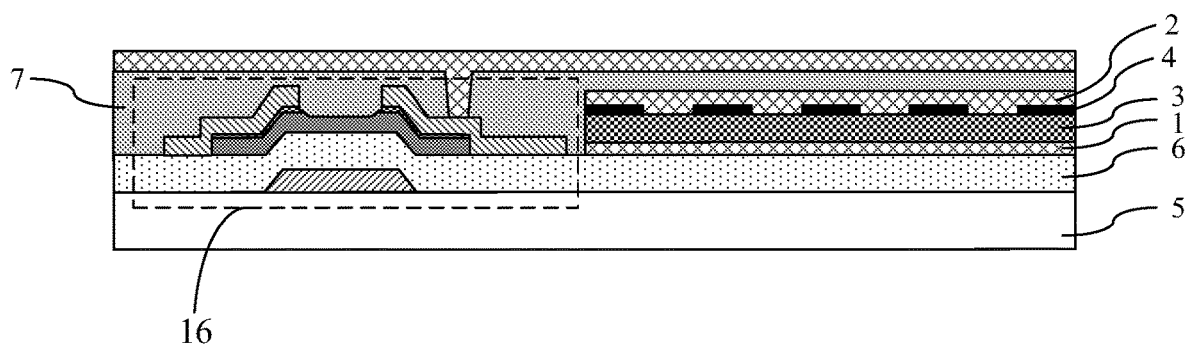
Figure 10:
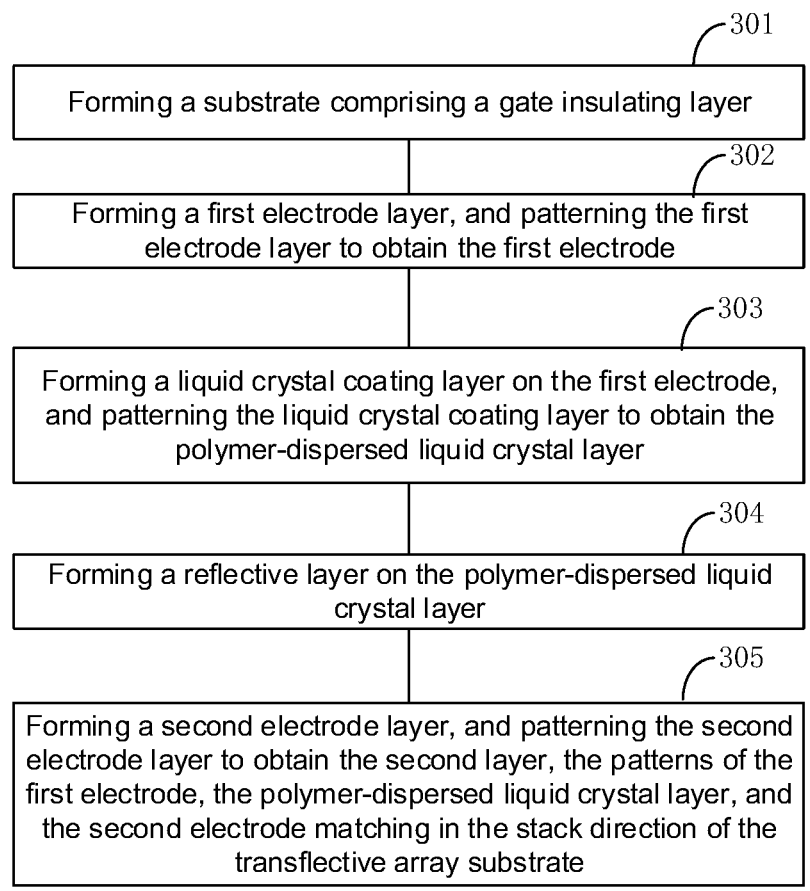
FIG. 10 shows a flow chart of the method of fabricating an array substrate illustrated in FIGS. 9A to 9F.

In at least some embodiments, a flattening layer is formed on the second electrode, for example, as shown in FIG. 9F. The flattening layer 7 may be formed by any appropriate process known to a person of ordinary skill in the art, and is not particularly limited. A pixel electrode is then formed on the flattening layer 7. The pixel electrode may be formed by any appropriate process known to a person of ordinary skill in the art, and is not particularly limited. The flattening layer 7 may be formed with through-holes, so as to allow the pixel electrode to be electrically connected to the drain electrode of the thin film transistor via through-holes in the flattening layer 7. It is also understood that the array substrate according to the present disclosure may also include any other suitable, additional components and/or accessories known to a person of ordinary skill in the art without departing from the spirit and scope of the present disclosure.

In the array substrate according to the present disclosure, the polymer-dispersed liquid crystal layer can be made to switch between a transparent state and an opaque, scattering state by controlling the applied electric field between the first electrode and the second electrode. When an electric field is applied between the first electrode and the second electrode, the polymer-dispersed liquid crystal layer is induced into a transparent state. Light emitted by the backlight is able to pass through the polymer-dispersed liquid crystal layer and the through-holes (or gaps) in the reflective layer. As a result, a transmissive display is produced. When backlight is not needed, the electric field between the first electrode and the second electrode is removed, which induces the polymer-dispersed liquid crystal layer into an opaque, scattering state. External incident light is reflected outward by the reflective layer, and is also diffuse-reflected by the polymer-dispersed liquid crystal layer. As a result, a reflective display is produced. Unlike conventional technologies, in the embodiments according to the present disclosure, the arrangement of the polymer-dispersed liquid crystal layer and the reflective layer in the same region of the array substrate makes it possible to switch the mode of display between a transmissive display and a reflective display. In turn, the uniformity of the image generated by the pixel area is improved, as is the quality of the resulting display. Further, since the construction of the array substrate according to the present disclosure forgoes undulating microstructures, it is possible to reduce the unevenness in the thin film transistor array substrate, which can further improve display quality.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. An array substrate, comprising:
   a base substrate,
   a first electrode and a second electrode on the base substrate,
   a polymer-dispersed liquid crystal layer between the first electrode and the second electrode,
   a reflective layer on a side of the polymer-dispersed liquid crystal layer opposite from the base substrate, and
   a thin film transistor component,
   wherein the polymer-dispersed liquid crystal layer is configured to switch between a transparent state and an opaque state in accordance with a voltage applied between the first electrode and the second electrode, and
   wherein the thin film transistor component is provided in a region of the array substrate that does not overlap with the first electrode, the polymer-dispersed liquid crystal layer, the reflective layer, and the second electrode.

2. The array substrate according to claim 1, wherein the first electrode, the polymer-dispersed liquid crystal layer, and the second electrode are patterned, and the patterns of the first electrode, the polymer-dispersed liquid crystal layer, and the second electrode correspond to each other.

3. The array substrate according to claim 1, wherein the first electrode, the polymer-dispersed liquid crystal layer, and the second electrode are patterned, and the patterns of the first electrode, the polymer-dispersed liquid crystal layer, and the second electrode correspond to each other in a stack direction of the array substrate.

4. The array substrate according to claim 1, wherein each of the first electrode and the second electrode comprises a transparent conductive material.

5. The array substrate according to claim 1, wherein each of the first electrode and the second electrode comprises indium tin oxide or graphene.

6. The array substrate according to claim 1,
wherein the reflective layer comprises a metal reflective layer and a plurality of through-holes in the metal reflective layer.

7. The array substrate according to claim 6, wherein the plurality of through-holes are arranged in an array.

8. The array substrate according to claim 1, wherein the reflective layer comprises a metal reflective layer and a plurality of gaps in the metal reflective layer.

9. The array substrate according to claim 6, wherein a ratio of a total area of the plurality of the metal reflective layer and a total cross-sectional area of openings of the plurality of through-holes is from 1:1 to 1:3.

10. The array substrate according to claim 1, further comprising a flattening layer on the second electrode.

11. A display panel comprising the array substrate according to claim 1.

12. The display panel according to claim 11, further comprising a color filter substrate and a liquid crystal layer between the array substrate and the color filter substrate.

13. The display panel according to claim 11, further comprising a backlight,
wherein the backlight is on a side of the base substrate opposite from the reflective layer.

14. A method of driving the array substrate according to claim 1, comprising controlling a voltage applied to the first electrode and the second electrode to switch the polymer-dispersed liquid crystal layer between the transparent state and the opaque state.

15. The method according to claim 14,
wherein when an intensity of an external light is smaller than an intensity of light emitted by a backlight, the method comprises applying the voltage to the first electrode and the second electrode, so as to switch the polymer-dispersed liquid crystal layer into the transparent state, and
wherein when the intensity of the external light is larger than the intensity of the light emitted by the backlight, the method comprises terminating the voltage applied to the first electrode and the second electrode, so as to switch the polymer-dispersed liquid crystal into the opaque state.

16. A method of fabricating the array substrate according to claim 1, comprising:
forming the first electrode on the base substrate,
forming the polymer-dispersed liquid crystal layer on the first electrode,
forming the reflective layer on the polymer-dispersed liquid crystal layer, and
forming the second electrode on the reflective layer,
wherein a pattern of the first electrode, a pattern of the polymer-dispersed liquid crystal layer, and a pattern of the second electrode, correspond to each other.

17. The method according to claim 16, wherein the pattern of the first electrode, the pattern of the polymer-dispersed liquid crystal layer, and the pattern of the second electrode, correspond to each other in a stack direction of the array substrate.

* * * * *